United States Patent
Ng et al.

(10) Patent No.: US 7,131,145 B2
(45) Date of Patent: Oct. 31, 2006

(54) METHOD FOR SIGNALLING TAMPERING OF REMOTELY POSITIONED COMPONENTS BY TAGGING AND GLOBAL POSITIONING SYSTEM MONITORING

(75) Inventors: Joseph S. Ng, Montebello, CA (US); Ismael Rodriguez, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 818 days.

(21) Appl. No.: 10/190,908

(22) Filed: Jul. 8, 2002

(65) Prior Publication Data

US 2003/0204739 A1  Oct. 30, 2003

Related U.S. Application Data

(60) Provisional application No. 60/376,255, filed on Apr. 29, 2002, provisional application No. 60/376,105, filed on Apr. 29, 2002, provisional application No. 60/376,244, filed on Apr. 29, 2002.

(51) Int. Cl.
*G06F 11/30* (2006.01)
*H04K 1/00* (2006.01)
*G06F 1/26* (2006.01)

(52) U.S. Cl. .................. 726/34; 713/189; 380/258; 726/35

(58) Field of Classification Search ............ None
See application file for complete search history.

(56) References Cited

U.S. PATENT DOCUMENTS 5,748,084 A * 5/1998 Isikoff .................. 726/35
5,790,074 A * 8/1998 Rangedahl et al. ..... 342/357.13
5,793,283 A * 8/1998 Davis .................. 340/426.19
6,263,441 B1 * 7/2001 Cromer et al. .......... 726/35

OTHER PUBLICATIONS

Kirovski et al., "Digital Rights Management for Digital Cinema," Inter. Symp. on Optical Science & Tech.—Security in Imaging: Theory & Applications, San Diego, CA, Jul. 2001, 16 pages.
National Association of Theatre Owners; "Digital Cinema User Requirements," Feb. 22, 2002, pp. 1-3.
Hose et al., "Data Transport and Processing in a Digital Cinema Theatre System," Qualcomm Incorporated from the 36th Advanced Motion Imaging Conference, Feb. 7-9, 2002, 21 pages.

* cited by examiner

*Primary Examiner*—Gilberto Barron
*Assistant Examiner*—Laurel Lashley
(74) *Attorney, Agent, or Firm*—Gates & Cooper LLP

(57) ABSTRACT

One or more embodiments of the invention provide a method, apparatus, system, and article of manufacture for monitoring components of a digital cinema system. A configuration of an exhibitor system (that has one or more components) of a digital cinema system is stored. Each of the one or more components is then polled (e.g., using radio frequency) based on the configuration. A determination is then made regarding the integrity of the exhibitor system based on the configuration and results of the polling. Further, a global positioning system (GPS) location and an identification (of a component) is received from an exhibitor system component. Based on the identification and the polling, a determination may be made regarding whether the identification is for an unauthorized component and consequently the location of the component for initiating enforcement action.

40 Claims, 5 Drawing Sheets

METHOD FOR SIGNALLING TAMPERING OF REMOTELY POSITIONED COMPONENTS BY TAGGING AND GLOBAL POSITIONING SYSTEM MONITORING

CROSS-REFERENCE TO RELATED APPLICATIONS

This application claims the benefit under 35 U.S.C. Section 119(e) of the following co-pending and commonly-assigned U.S. provisional patent applications, which are incorporated by reference herein:

Provisional Application Se. No. 60/376,255, filed Apr. 29, 2002, by Joseph S. Ng and Ismael Rodriguez, entitled "A METHOD TO SIGNAL TAMPERING OF REMOTELY POSITIONED COMPONENTS BY TAGGING AND GPS MONITORING";

Provisional Application Ser. No. 60/376,105, filed Apr. 29, 2002, by Charles F. Stirling, Bernard M. Gudaitis, William G. Connelly and Catherine C. Girardey, entitled "SECURE DATA CONTENT DELIVERY SYSTEM FOR MULTIMEDIA APPLICATIONS UTILIZING BANDWIDTH EFFICIENT MODULATION"; and Provisional Application Ser. No. 60/376,244, filed Apr. 29, 2002, by Ismael Rodriguez and James C. Campanella, entitled "A METHOD TO SECURELY DISTRIBUTE LARGE DIGITAL VIDEO/DATA FILES WITH OPTIMUM SECURITY".

This application is related to the following co-pending and commonly-assigned patent application, which application is incorporated by reference herein:

U.S. patent application Ser. No. 10/191,346, filed on the same date herewith entitled "METHOD AND APPARATUS FOR INTEGRATING AND MONITORING KEY DIGITAL CINEMA SYSTEM COMPONENTS AS A MEANS TO VERIFY SYSTEM INTEGRITY", by Joseph S. Ng, Ismael Rodriguez, and Antonie C. Smith.

BACKGROUND OF THE INVENTION

1. Field of the Invention

The present invention relates generally to digital cinema systems, and in particular, to a method, apparatus, and article of manufacture for protecting the configuration and integrity of components of a digital cinema system against unauthorized removal, resale, and reuse of the components.

2. Description of the Related Art

The methods by which movies and other media programs that are distributed to theaters for display to audiences have not substantially changed in over 75 years. Celluloid copies of such movies are distributed to each theater in advance of the first showing, and the same copy is repeatedly displayed for audiences until the movie is excessively worn, the license expires, or the theater stops showing the movie in favor of a more popular movie.

There are several problems with this process. First, the process of manually and securely distributing physical celluloid copies of each movie is costly. Second, it is time consuming. This is especially important in circumstances where last minute changes must be made to the film before release. Such time concerns often prohibit that any such changes be made.

There is therefore a need for a method and system for distributing media programs in a rapid and inexpensive manner. As will be described further herein, the present invention solves that need by providing for the distribution of digital copies of media programs via a satellite or other high bandwidth medium. For example, digital cinema systems provide the ability for distributing digital copies of motion picture "films" electronically directly to theaters running exhibitor systems.

However, the use of digital cinema systems presents additional challenges. For example, components of both distribution centers and exhibitor systems are fairly expensive. Accordingly, currently, there are very few digital cinema exhibitor installations in the world. Further, as digital cinema systems are deployed on a large scale, owners and theaters may desire to protect and prevent the unauthorized removal, resale, and reuse of the exhibitor system components. The prior art fails to provide any system or method for preventing theft and protecting such exhibitor systems.

What is needed is a system and method for the distribution of digital media that reduces the cost of components of the system or enables the disabling or tracking of components of the system to prevent the unauthorized, removal, resale, and/or use of the components. The present invention satisfies these needs.

As part of a system and method for protecting exhibitor systems (and their components), one or more embodiments of the invention may utilize a global positioning system (GPS). In the prior art, GPS has been used to determine a basic position, get from one location to another, monitor the movement of people and things, create maps, and/or bring precise timing to various parts of the world. However, GPS, has not been used to protect components of a digital cinema system. GPS is a worldwide radio-navigation system formed from a constellation of 24 satellites and their ground stations. GPS uses the satellites as reference points to calculate positions accurate to a matter of meters. To determine a location, a GPS receiver receives a pseudo random code transmitted from at least three satellites. The pseudo random code contains navigation information and timing information that is then used to calculate the distance from each satellite which is then used to triangulate the exact position of the GPS receiver.

SUMMARY OF THE INVENTION

Exhibitor systems in digital cinema systems are constructed by a number of high value components. Historically, high value components are prone to unauthorized removal and unauthorized resale and reuse. One or more embodiments of the invention attempt to ensure the integrity of an exhibitor system. Key components of the exhibitor system are utilized. These key components may be composed of a single or multiple satellite receivers, high-speed wide area networks, file servers, decryption units, decompression units, gigabit local area networks, smart card readers, and digital projectors. There are two primary sections to this invention, the radio frequency (RF) monitoring section and the global positioning system (GPS) section. These two sections may be used individually or in conjunction for maximum protection.

The RF monitoring section of the invention signals a network operation center (NOC) and sends a pager message to an exhibitor's representative as soon as a component is removed without authorization from the exhibitor location. The GPS section of the invention reports the location of the unauthorized reuse component as soon as it is activated at a new location.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1A:
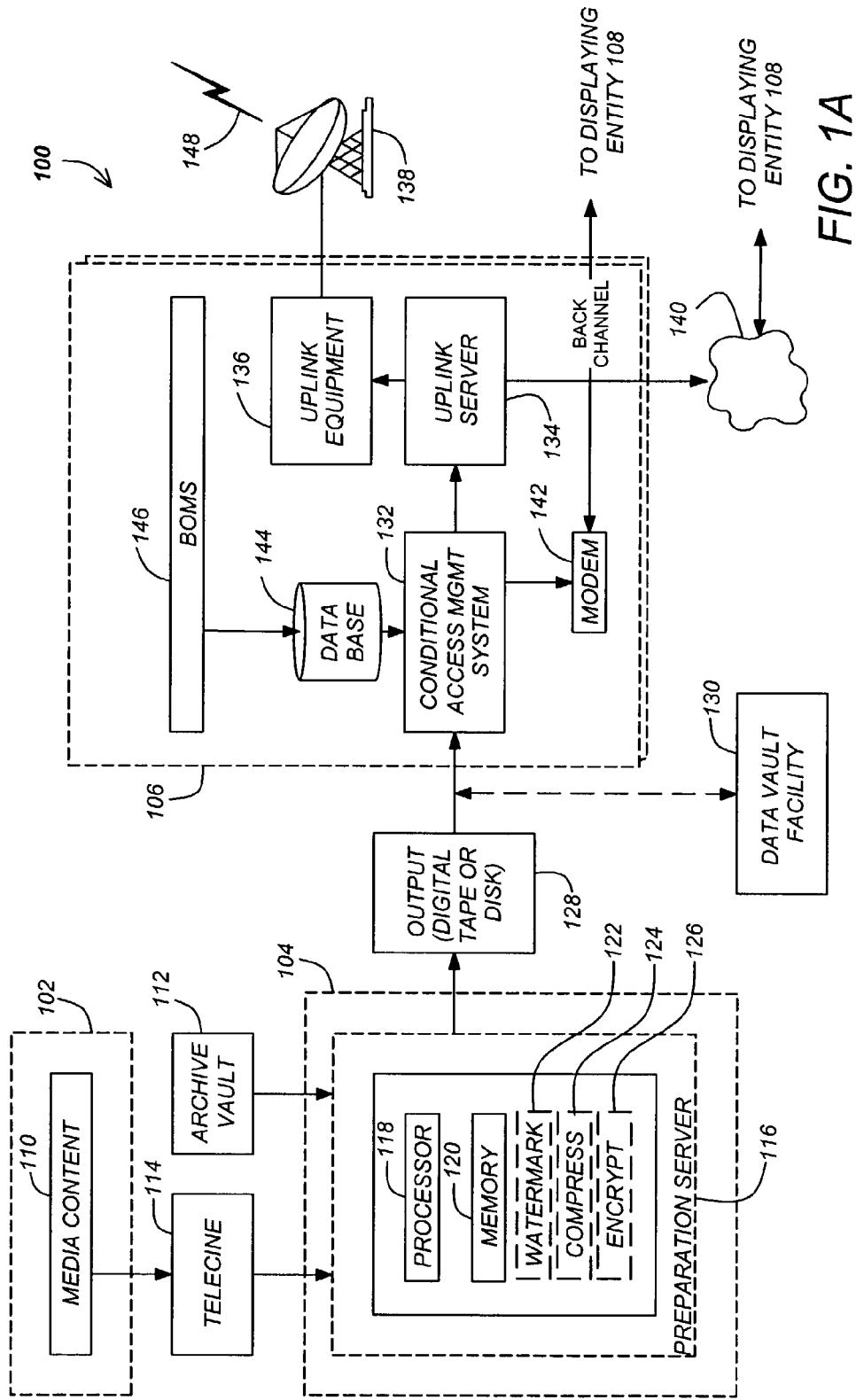
FIGS. 1A and 1B depict a top-level functional block diagram of a media program distribution system in accordance with one or more embodiments of the invention.
Figure 1B:
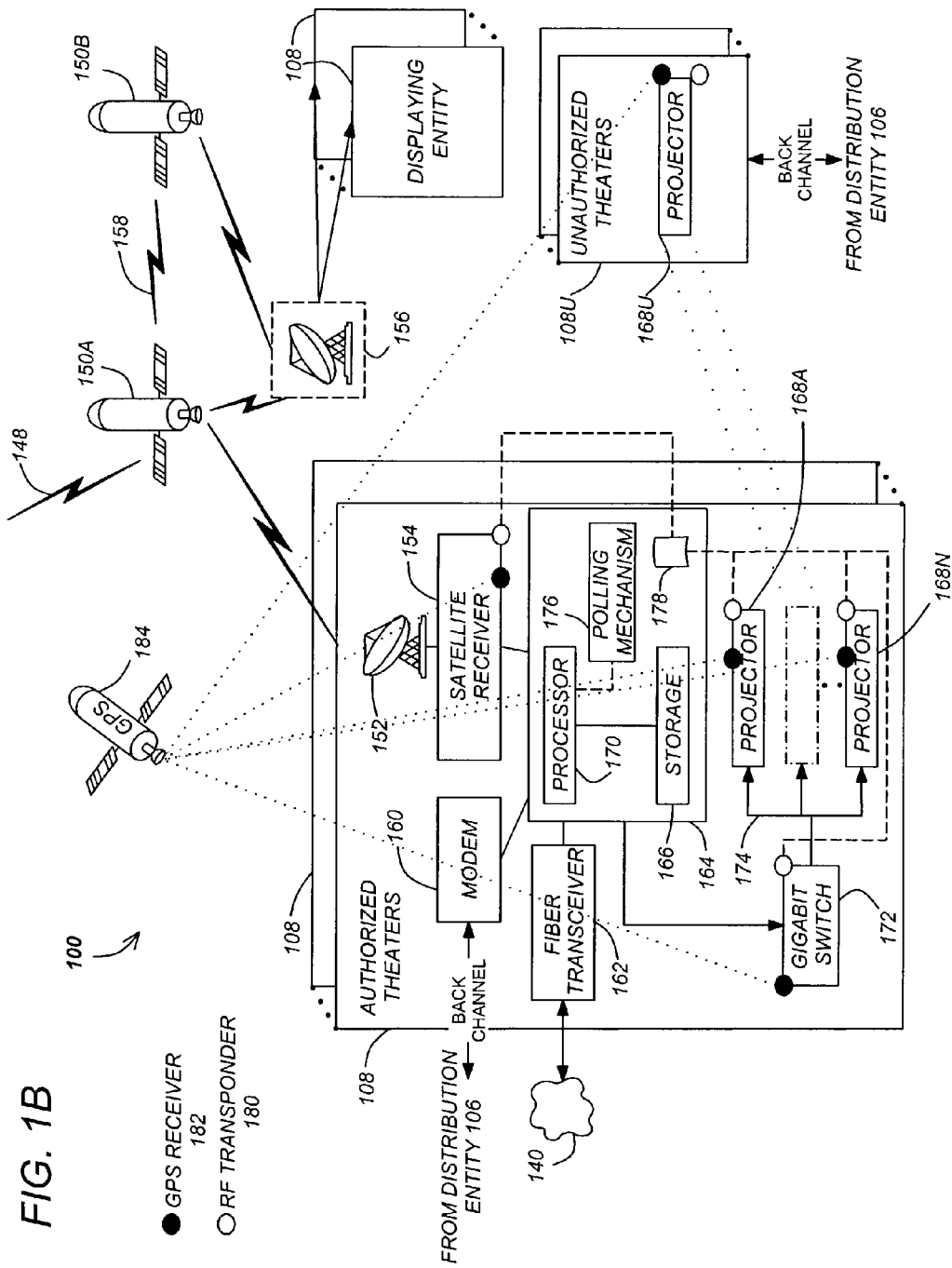

FIGS. 1A and 1B depict a top-level functional block diagram of one embodiment of a media program distribution system 100. The media distribution system 100 comprises a content provider 102, a protection entity 104, a distribution entity 106 and one or more presentation/displaying entities (also referred to as exhibitor systems or theaters) 108. The content provider 102 provides media content 110 such as audiovisual material to the protection entity 104. The media content 110, which can be in digital or analog form, can be transmitted in electronic form via the Internet, by dedicated land line, broadcast, or by physical delivery of a physical embodiment of the media (e.g. a celluloid film strip, optical or magnetic disk/tape). Content can also be provided to the protection entity 104 (also referred to as a preparation entity) from a secure archive facility 112.

The media content 110 may be telecined by processor 114 to format the media program as desired. The telecine process can take place at the content provider 102, the protection entity 104, or a third party.

The protection entity 104 may include a media preparation processor (also referred to as preparation server) 116. In one embodiment, the media preparation processor 116 includes a computer system such as a server, having a processor 118 and a memory 120 communicatively coupled thereto. The protection entity 104 further prepares the media content 110. Such preparation may include adding protection to the media content 110 to prevent piracy of the media content 110. For example, the preparation processor 116 can add watermarking 122 and/or encrypt 126 the media content 110 to protect it. In addition, the preparation processor can also apply compression 124 to the media content 110. Once prepared, the output media content 128 can be transferred to digital tape or a disk (e.g. a DVD, laserdisk, or similar medium). The output media content 128 can then be archived in a data vault facility 130 until it is needed.

When needed, the prepared output media content 128 is then provided to the distribution entity 106 (alternatively referred to hereinafter as the network operations center [NOC]). Although illustrated as separate entities, the protection entity 104 and the distribution entity 106 can be combined into a single entity, thus ameliorating some security concerns regarding the transmission of the output media content 128.

The distribution entity 106 includes a conditional access management system (CAMS) 132 (also referred to as a configuration management engine), that accepts the output media content 128, and determines whether access permissions are appropriate for the content 128. Further, CAMS 132 may be responsible for additional encrypting so that unauthorized access during transmission is prevented. Once the data is in the appropriate format and access permissions have been validated, CAMS 132 provides the output media content 128 to an uplink server 134, ultimately for transmission by uplink equipment 136 to one or more displaying entities 108 (also referred to as exhibitor systems) (shown in FIG. 1B). This is accomplished by the uplink equipment 136 and uplink antenna 138. Also, as shown, in addition to or in the alternative to transmission via satellite, the media program can be provided to the displaying entity 108 via a forward channel fiber network 140. Additionally, information may be transmitted to displaying entity 108 via a modem 142 using, for example a public switched telephone network line. A land based communication such as through fiber network 140 or modem 142 is referred to as a back channel. Thus, information can be transmitted to and from the displaying entity 108 via the back channel or the satellite network. Typically, the back channel provides data communication for administration functions (e.g. billing, authorization, usage tracking, etc.), while the satellite network provides for transfer of the output media content 128 to the displaying entities 108.

The output media content 128 may be securely stored in a database 144 (also referred to as a master database 144). Additionally, information regarding displaying entity 106 may be stored in master database 144. Such information may include configuration information regarding components of distribution entity 106. In this regard, strong authentication (such as a smart card) may be required to control read/write access to the master database 144. Data is transferred to and from the master database 144 under the control and management of the business operations management system (BOMS) 146. Thus, the BOMS 146 manages the transmission of information to 108, and assures that unauthorized transmissions do not take place.

Turning to FIG. 1B, the data transmitted via uplink 148 is received in a satellite 150A, and transmitted to a downlink antenna 152, which is communicatively coupled to one or more satellites or downlink receivers 154.

In one embodiment, the satellite 150A also transmits the data to an alternate distribution entity 156 and/or to another satellite 150B via crosslink 158. Typically, satellite 150B services a different terrestrial region than satellite 150A, and transmits data to displaying entities 108 in other geographical locations.

Figure 2:
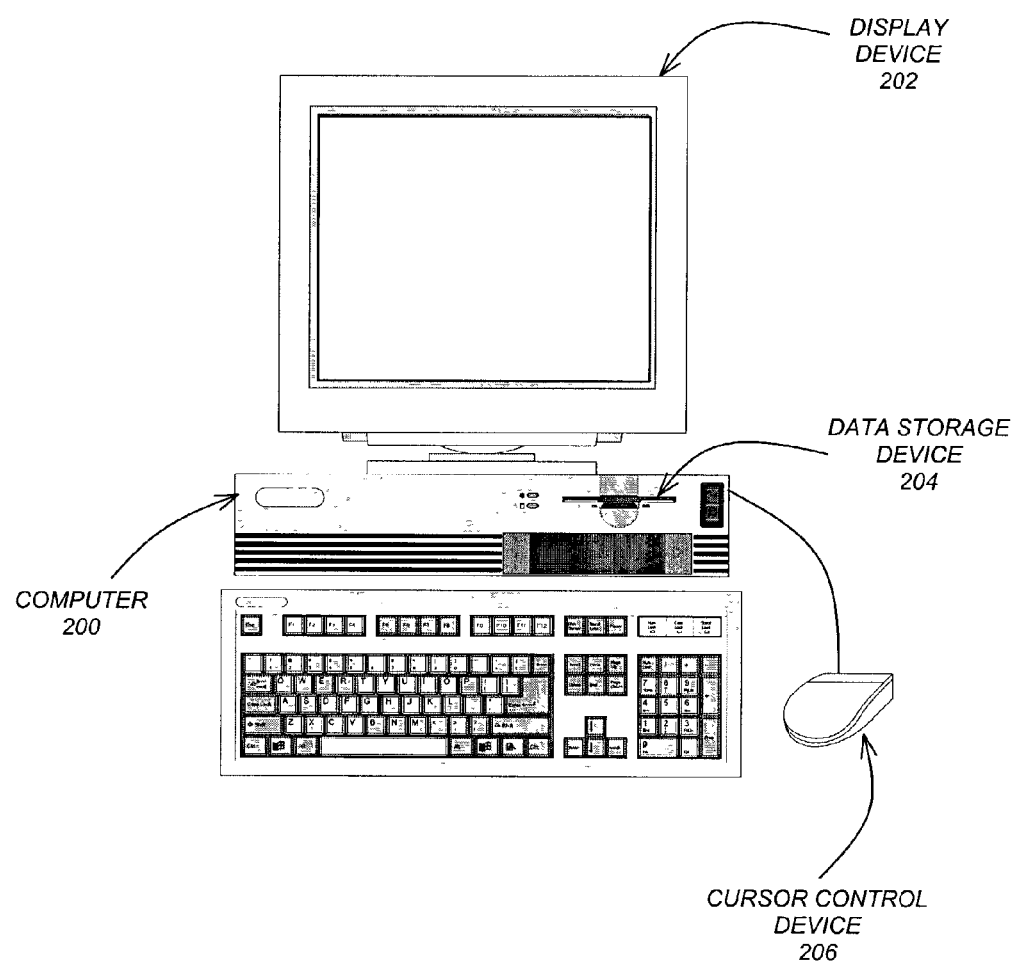
FIG. 2 is a functional block diagram of a computer system that can be used to perform the operations of a media preparation processor and processing system in accordance with one or more embodiments of the invention.

A typical displaying entity 108 comprises a modem 160 (and may also include a fiber transceiver 162) for receiving and transmitting information through the back channel (i.e., via a communication path other than that provided by the satellite system described above) to and from the distribution entity 106. For example, feedback information (e.g. relating to system diagnostics, billing, usage and other administrative functions) from the exhibitor 108 can be transmitted through the back channel to the distribution entity 106. The output media content 128 and other information may be accepted into a processing system 164 (also referred to as a content server or admin server) such as a server or computer similar to that which is illustrated in FIG. 2 (see description below). The output media content 128 may then be stored in the storage device 166 (and/or one or more file servers) for later transmission to displaying systems (e.g., digital projectors) 168A–168N through gigabit switch 172 and gigabit Ethernet 174. Before storage, the output media content 128 can be decrypted to remove transmission encryption (e.g. any encryption applied by the CAMS 132), leaving the encryption applied by the preparation processor 116.

When the displaying entity 108 is set up, the configuration of the displaying entity 108 (i.e., the identification and placement/use management of components of local displaying entity 108) is established. In addition to storing media content 110 in storage 166, the established configuration of displaying entity 108 may be stored therein. In this regard, strong authentication (e.g., a smart card) may be required to control read/write access to the local database storage 166. This stored configuration information may also be referred to and stored in a member component database. The member component database identifies all member components of this specific displaying entity 108 including spare components. Such an identification may include a permanent identification of each member component (including spare components). In this regard, each component may be identified by a unique permanent identification. Such an identification may be an unalterable identification that is one-time programmed during the manufacture of the component. Thus, the member component database/configuration is stored in nonvolatile memory at the local displaying entity 108. A copy of the member component database may also be maintained in the master database 144 at the distribution entity 106.

To ensure the integrity of the exhibitor system 108 and to protect against tampering, two (2) independent mechanisms may be utilized: a radio frequency (RF) monitoring mechanism and a global positioning system (GPS) mechanism. These two mechanisms may run independently or in conjunction with each other.

Radio Frequency (RF) Mechanism

Components of the display system 108 may also be viewed as part of a radio frequency (RF) monitoring section composed of two parts, an RF reader 178 and an RF transponder 180. The RF reader 178 uses low power unlicensed frequency such as 900 MHz and multiple access methods such as Time Division Multiple Access (TDMA) or Code Division Multiple Access (CDMA) to poll the RF transponder 180 periodically. A polling mechanism 176 may control when the RF reader 178 polls the relevant RF transponders 180. For example, polling may be conducted at regular or irregular intervals or upon the occurrence of a particular event (e.g., upon power up of a component, the playing of a movie or advertisement). Such an RF reader 178 and polling mechanism 180 may be utilized to verify that each permanent identification is included in an exhibitor system's 108 member component database.

In this regard, the RF reader 178 should have a range to cover the exhibitor system 108 installation area, such as projection rooms and server/network room. The list of RF transponders 180 (i.e., member component database containing the permanent identification of each component in the exhibitor system configuration) is programmed into the RF reader 178 (or storage 166) using strong authentication (e.g., a smart card) to ensure the integrity of the list.

At various time intervals (e.g., when a projector 168A-N or gigabit switch 172) is brought into service) a polling mechanism 176 initiates a polling sequence wherein each RF transponder 180 is polled. A response from each RF transponder 180 identified in the configuration is expected.

Each RF transponder 180 is an integral part of an exhibitor system 108 component and contains a unique permanent identification that identifies the component. Accordingly, when the RF reader 178 polls the RF transponder 180, the RF transponder 180 will respond back with its permanent identification and an unauthorized tampering status for the component. Additionally, each RF transponder may contain a battery. Such a battery may provide five (5) years of operation time when the exhibitor system 108 is not powered. Additionally, when the exhibitor system 108 is powered, the RF transponder battery may be charged by the exhibitor system 108 component's power supply.

The tampering status indicates if the component has been tampered with or altered in any unauthorized manner. For example, if a component projector 108 was reconfigured to display on a larger screen than when initially set up, the tampering status may be positive. The tampering status may merely comprise a Boolean flag indicating that the component has been tampered with or may also contain relevant information regarding details of the type of tampering that has occurred.

If during the polling sequence, an RF transponder 180 does not respond or reports an authorized tampering of the exhibitor system 108 component, a message may be transmitted to the distribution entity 106. For example, if a projector 168 is moved from an authorized theater 108 to an unauthorized theater 108U, the RF transponder on the unauthorized projector 168U will not respond. Accordingly, a missing projector 168 is reported to the distribution entity 106. In response, the distribution entity 106 may notify an appropriate entity/person (e.g., a page to an exhibitor's representative).

Global Positioning System (GPS) Mechanism

A GPS receiver 182 is an integral part of each exhibitor system 108 component (e.g., projector 168A-N, gigabit switch 172, satellite receiver 154, etc.). Each GPS receiver 182 is able to determine its location based on one or more transmissions from various GPS satellites 184. When each component is brought into service as part of a displaying entity 108 or during a power up process, the exhibitor system component reports its permanent identification and GPS location to the distribution entity 106 (e.g., through the back channel).

As described above, when a component is reported as having been tampered with or failing to respond during a polling, the distribution entity 106 is notified of the component and the tampering that has occurred. Accordingly, the distribution entity 106 maintains the knowledge of whether a component has been removed or tampered with. Based on this knowledge, upon receipt of the permanent identification and GPS location of each component, if the distribution entity 106 detects that a particular exhibitor system 108 component's permanent identification is an unauthorized unit, enforcement action can be initiated. For example, an exhibitor system's 108 administrator or local law enforcement agency may be contacted.

Display of Content

Once the integrity of the display entity 108 has been validated (i.e., permanent identifications obtained through the RF and GPS system match those in the member component database) output media content 128 may be processed for display. Final decryption techniques are used on the output media content 128 to substantially reproduce the original media content 110 in a viewable form which is provided to one or more of the displaying systems 168A–168N. Accordingly, displaying entity 108 may also include decryption units, decompression units, and/or smart card readers to assist in displaying media content 110. For example, encryption 126 and compression 124 applied by the preparation processor 118 is finally removed, however, any latent modification, undetectable to viewers (e.g., watermarking 122) is left intact. In one or more embodiments, a display processor 170 prevents storage of the decrypted media content in any media, whether in the storage device 166 or otherwise. In addition, the media content 110 can be communicated to the displaying systems 168A–168N over independently encrypted connections and/or high-speed wide area or local area networks, such as through gigabit switch 172 and gigabit Ethernet 174.

FIG. 2 is a functional block diagram of a computer system 200 that can be used to perform the operations of the media preparation processor 116 and processing system 164. Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 200.

Programs executing on the computer 200 (such as an operating system) are comprised of instructions which, when read and executed by the computer 200, causes the computer 200 to perform the steps necessary to implement and/or use the present invention. Computer programs and/or operating instructions may also be tangibly embodied in a memory and/or data communications devices of the computer, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Logic for Tamper Protection Using Tagging and GPS

Figure 3:
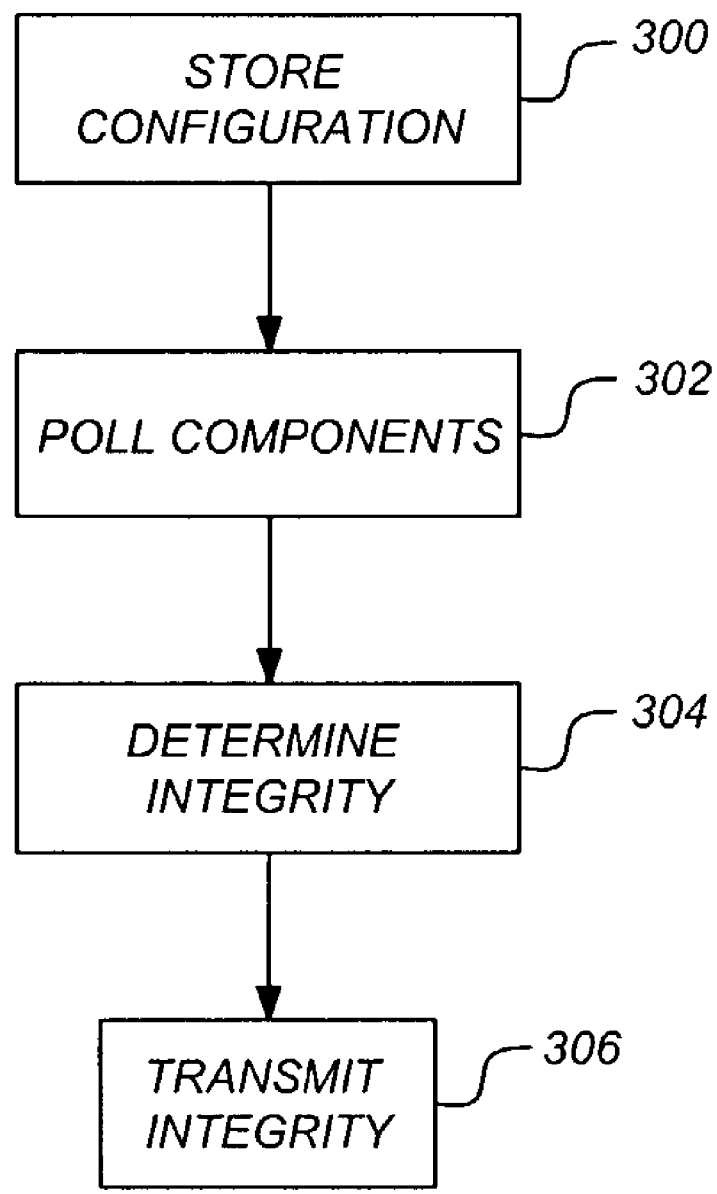
FIG. 3 is a flow chart illustrating the use of radio frequency (RF) monitoring in accordance with one or more embodiments of the invention.
Figure 4:
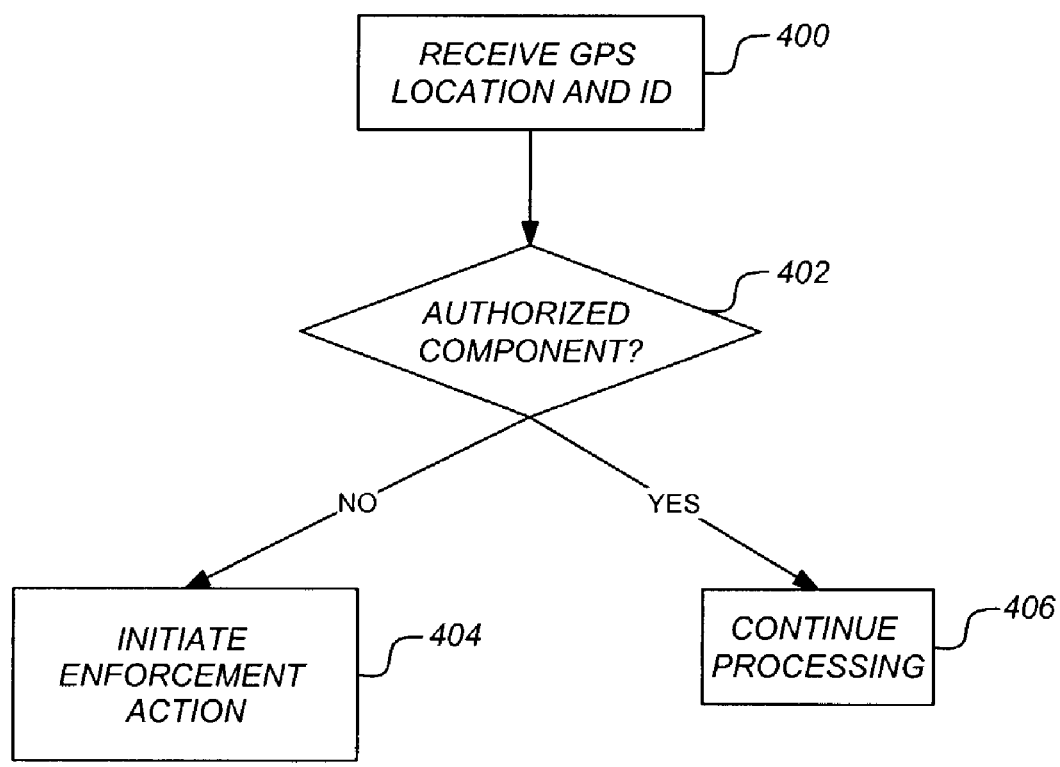
FIG. 4 is a flow chart illustrating the use of a global positioning system (GPS) in accordance with one or more embodiments of the invention.

FIGS. 3 and 4 are flow charts illustrating the logic for tamper protection using tagging and GPS in accordance with one or more embodiments of the invention. Specifically, FIG. 3 illustrates the RF monitoring component of the invention and FIG. 4 illustrates the GPS portion of the invention.

Referring to FIG. 3, at step 300, a configuration (e.g., a list) of the exhibitor system 108 (comprised of one or more components) is stored. As described above, such a configuration may be stored using strong authentication and may comprise a unique permanent unalterable identification that is one-time programmed during manufacture of the component. Further, the identification may identify a RF transponder 180 integrated into each component and/or identify the component itself At step 302, each of the one or more components is polled based on the configuration. Such a polling may use a RF low power unlicensed frequency and/or a multiple access method. Accordingly, the polling may utilize a RF receiver 178 to poll a RF transponder 180 that is an integral part of each of the exhibitor system components. In this regard, the RF reader 178 has a range sufficient to cover an installation area of the exhibitor system 108. Further, the RF transponder 180 may contain a battery that provides power to the RF transponder 180. Responses are received by the RF reader 178 from the RF transponders 180 during the polling. Such a response may include the identification of the component and a tampering status.

At step 304, the integrity of the exhibitor system 108 is determined (i.e., whether the integrity has been compromised) based on the configuration and results of the polling. For example, if a response is not received from one of the components or if an unauthorized tampering status is received during the polling, the system determines that the integrity has been compromised. At step 306, a message regarding the integrity is transmitted to the distribution entity 106 (e.g., for further action).

The processing may then continue with FIG. 4. At step 400, a GPS location and first identification is received from an exhibitor system 108 component. Thus, a GPS receiver 182 that is an integral part of each component determines its location and transmits the location and identification to the distribution entity 106 (e.g., through the back channel) or to a polling mechanism 176. Such a transmission may occur during a power up process of each component.

At step 402, the recipient (e.g., the distribution entity 106 or display entity 108) of the transmitted information (i.e., the identification and GPS location) determines if the identification is for an authorized component. Such a determination may be based on the message (that contains an identification of a component) received from the exhibitor system 108 during the polling of the components (i.e., a message that identifies a component as having been tampered with or not responding during a polling). Thus, if the identification of an unauthorized component (as determined by the polling mechanism 176 or RF reader 178) matches the identification received from the component, then the system can determine that the currently transmitting component is unauthorized.

If the component is unauthorized, enforcement action may be initiated at step 404. Alternatively, if the component is authorized, processing may continue at step 406.

Conclusion

This concludes the description of the preferred embodiment of the invention. The following describes some alternative embodiments for accomplishing the present invention. For example, any type of computer, such as a mainframe, minicomputer, personal computer, or computer configuration, such as a timesharing mainframe, local area network, or standalone personal computer, could be used with the present invention. Further, the signal tampering of remotely positioned components system as described herein can be applied to several larger or smaller vertical markets with a need to protect high value electronics assets.

In summary, embodiments of the invention involve the use of RF monitoring and GPS technology to protect the configuration and integrity of the high value exhibitor system (and key components of the exhibitor system) against unauthorized removal and unauthorized resale and reuse of exhibitor system components with minimum human intervention. If the GPS section detects an unauthorized unit, the network operation center knows where to recover the unauthorized exhibitor system component. Thus, use of the invention helps to prevent or reduce the number of stolen high value equipment and/or its improper use. Accordingly, the invention can greatly reduce the operation cost of the exhibitor system due to unauthorized removal, resale, and reuse of high value components. Further, the time required to recover an unauthorized component may be reduced.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for monitoring components of a digital cinema system comprising:
   (a) storing a configuration of an exhibitor theater system of a digital cinema system, wherein the exhibitor theater system comprises one or more components, wherein the one or more components comprise:
      (i) a decryption unit;
      (ii) a decompression unit;
      (iii) a digital projector; and
      (iv) a display screen;
   (b) polling each of the one or more components based on the configuration; and
   (c) determining whether an integrity of the exhibitor theater system has been compromised based on the configuration and results of the polling.

2. The method of claim 1, wherein the configuration is stored using strong authentication.

3. The method of claim 1, wherein the configuration comprises a list of the one or more components.

4. The method of claim 1, wherein the polling uses a low power unlicensed frequency.

5. The method of claim 1, wherein the polling utilizes a multiple access method.

6. The method of claim 1, wherein the polling comprises utilizing a radio frequency (RF) reader to poll an RF transponder of each of the one or more components.

7. The method of claim 6, wherein the RF trasponder is an integral part of the one or more components.

8. The method of claim 6, wherein the RF reader has a range sufficient to cover an installation area of the exhibitor theater system.

9. The method of claim 6, wherein each RF transponder comprises a battery to provide power to the RF transponder.

10. The method of claim 1, wherein each component comprises a unique permanent unalterable identification that is one-rime programmed during manufacture of the component.

11. The method of claim 10, further comprising receiving the unique permanent unalterable identification and a tampering status from each component in response to the polling.

12. The method of claim 1 wherein the integrity of the exhibitor theater system is determined to be compromised if a response is nor received from one of the components during the polling.

13. The method of claim 1 wherein the integrity of the exhibitor theater system is determined to be compromised if a report of unauthorized tampering has been received from one of the components during the polling.

14. The method of claim 1 further comprising transmitting a message regarding the integrity of the exhibitor theater system to a network operation center.

15. A method for monitoring a component of a digital cinema system comprising:
   (a) receiving a global positioning system (GPS) location and a first identification from one or more exhibitor theater system components of an exhibitor theater system of a digital cinema system, wherein the one or more exhibitor theater components comprise:
      (i) a decryption unit;
      (ii) a decompression unit;
      (iii) a digital projector; and
      (iv) a display screen; and
   (b) determining whether the first identification is for an unauthorized component.

16. The method of claim 15, wherein a GPS receiver is an integral part of each of the one or more exhibitor system components.

17. The method of claim 15, wherein the GPS location is received during a power up process of one or mote of the exhibitor system components.

18. The method of claim 15, further comprising initiating enforcement action if the first identification is for an unauthorized component.

19. The method of chin 15, wherein determining whether the first identification is for an unauthorized component comprises:
   receiving a message indicating an integrity of an exhibitor theater system has been compromised, wherein the message comprises a second identification of an exhibitor theater system component that has been compromised;
   determining that the first identification is for on unauthorized component if the first identification and second identification are the same.

20. The method of claim 19, wherein the integrity of the exhibitor theater system is determined to be compromised by:
   storing a configuration of the exhibitor theater system,
   polling each of the one or more exhibitor theater system components based on the configuration; and
   determining whether the integrity of the exhibitor theater system has been compromised based on the configuration and results of the polling.

21. A system for monitoring components of a digital cinema system comprising:
   (a) a computer having a memory;
   (b) a configuration of an exhibitor theater system of a digital cinema system stored in the memory, wherein the exhibitor theater system comprises one or more components, wherein the one or more components comprise:
      (i) a decryption unit:
      (ii) a decompression unit;
      (iii) a digital projector; and
      (iv) a display screen; and
   (c) wherein the computer is configured to:
      (i) poll each of the one or more components based on the configuration; and
      (ii) determine whether an integrity of the exhibitor theater system has been compromised based on the configuration and results of the polling.

22. The system of claim 21, wherein the configuration is stored using strong authentication.

23. The system of claim 21, wherein the configuration comprises a list of the one or more components.

24. The system of claim 21, wherein the computer is configured to poll using a low power unlicensed frequency.

25. The system of claim 21, wherein the computer is configured to poll utilizing a multiple access method.

26. The system of claim 21, wherein the computer further comprises a radio frequency (RF) reader that is utilized to poll an RF transponder of each of the one or more components.

27. The system of claim 26, wherein the RF transponder is an integral part of the one or more components.

28. The system of claim 26, wherein the RF reader has a range sufficient to cover an installation area of the exhibitor system.

29. The system of claim 26, wherein each RF transponder comprises a battery to provide power to the RF transponder.

30. The system of claim 21, wherein each component comprises a unique permanent unalterable identification that is one-time programmed during manufacture of the component.

31. The system of claim 30, wherein the computer is further configured to receive the unique permanent unalterable identification and a tampering status from each component in response to the polling.

32. The system of claim 21 wherein the computer determines that the integrity of the exhibitor theater system has been compromised if a response is not received from one of the components during the polling.

33. The system of claim 21 wherein the computer determines that the integrity of the exhibitor theater system has been compromised if a report of unauthorized tampering has been received from one of the components during the polling.

34. The system of claim 21 wherein the computer is further configured to transmit a message regarding the integrity of the exhibitor theater system to a network operation center.

35. A system for monitoring a component of a digital cinema System comprising:
    (a) first identification of one or more exhibitor theater system components of an exhibitor theater system of a digital cinema system, wherein the one or more exhibitor theater system components comprise:
        (i) a decryption unit;
        (ii) a decompression unit;
        (iii) a digital projector; and
        (iv) a display screen;
    (b) a global positioning system (OPS) location of one or more of the exhibitor system components; and
    (c) a network operations center configured to:
        (i) receive the GPS location and the first identification from the one or more exhibitor theater system components; and
        (ii) determine whether the first identification is for an unauthorized component.

36. The system of claim 35, wherein a GPS receiver is an integral part of one or more of the exhibitor theater system components.

37. The system of claim 35, wherein the GPS location is received daring a power up process of one or more of the exhibitor theater system component.

38. The system of claim 35, wherein the network operations center is further configured to initiate enforcement action if the first identification is for an unauthorized component.

39. The system of claim 35, wherein the network operations center is configured to determine whether the first identification is for an unauthorized component by:
    receiving a message indicating an integrity of an exhibitor theater system has been compromised, wherein the message comprises a second identification of one or more of the exhibitor theater system components that has been compromised;
    determining that the first identification is for an unauthorized component if the first identification and second identification are the same.

40. The system of claim 39, wherein the integrity of the exhibitor theater system has been determined to be compromised by:
    storing a configuration of the exhibitor theater system;
    polling each of the one or more exhibitor theater system components based on the configuration; and
    determining whether an integrity of the exhibitor theater system has been compromised based on the configuration and results of the polling.

* * * * *